US00RE44710E

(19) United States
(12) Reissued Patent
Ponton

(10) Patent Number: US RE44,710 E
(45) Date of Reissued Patent: Jan. 21, 2014

(54) PUMP-TYPE PACKAGING UNIT FOR A LIQUID OR SEMI-LIQUID PRODUCT

(75) Inventor: Thierry Ponton, Maisons Alfort (FR)

(73) Assignee: L'Oreal, Paris (FR)

(21) Appl. No.: 09/986,720

(22) Filed: Nov. 9, 2001

Related U.S. Patent Documents

Reissue of:
(64) Patent No.: 6,089,410
Issued: Jul. 18, 2000
Appl. No.: 09/138,666
Filed: Aug. 24, 1998

(30) Foreign Application Priority Data

Aug. 27, 1997 (FR) ..... 97 10708

(51) Int. Cl.
*B67D 7/06* (2010.01)

(52) U.S. Cl.
USPC ..... 222/183; 222/321.8; 222/383.1; 222/402.13

(58) Field of Classification Search
USPC ..... 222/182–183, 321.7, 321.8, 321.9, 222/383.1, 385, 402.13
See application file for complete search history.

(56) References Cited

U.S. PATENT DOCUMENTS

| | | | | | |
|---|---|---|---|---|---|
| 3,189,232 | A | * | 6/1965 | Joffe | 222/402.13 |
| 3,471,065 | A | * | 10/1969 | Malone | 222/321.1 |
| 3,907,175 | A | * | 9/1975 | Haas | 222/402.13 |
| 3,958,726 | A | * | 5/1976 | Trotta | 222/402.13 |
| 3,967,760 | A | * | 7/1976 | Marcon | 222/153.11 |
| 4,196,828 | A | * | 4/1980 | Basile et al. | 222/340 |
| 4,573,613 | A | * | 3/1986 | de Freitas | 222/213 |
| 4,664,300 | A | * | 5/1987 | Strickland | 222/402.13 |
| 5,154,323 | A | * | 10/1992 | Query et al. | 222/153.11 |
| 5,238,156 | A | * | 8/1993 | Andris | 222/207 |
| 5,332,129 | A | * | 7/1994 | Brattoli et al. | 222/321.7 |
| 5,693,227 | A | * | 12/1997 | Costa | 210/650 |
| 5,693,278 | A | * | 12/1997 | Clements | 264/176.1 |
| 5,772,079 | A | * | 6/1998 | Gueret | 222/321.7 |
| 5,865,353 | A | * | 2/1999 | Baudin | 222/546 |
| 6,073,815 | A | * | 6/2000 | Ponton | 222/402.21 |

FOREIGN PATENT DOCUMENTS

| | | |
|---|---|---|
| DE | 26 55 777 | 6/1978 |
| DE | 26 55 777 A1 | 6/1978 |
| EP | 0 708 031 | 4/1996 |
| FR | 1 258 884 | 8/1961 |
| FR | 2 271 995 | 12/1975 |
| FR | 2 391 625 | 12/1978 |
| GB | 1 558 546 | 1/1980 |

* cited by examiner

*Primary Examiner* — Frederick C Nicolas
(74) *Attorney, Agent, or Firm* — Novak Druce Connolly Bove + Quigg LLP

(57) ABSTRACT

A unit (1) for packaging and dispensing a liquid or semi-liquid product includes a body (10) with an axis X, forming a reservoir (12) for the liquid or semi-liquid product, the reservoir (12) being surmounted by a pump (30) actuable by an actuating element (34). The product emerges through at least one opening arranged in an outlet element (9) connected to the pump (30) by a conduit (41) forming a flexible connection. The outlet element (9) is held substantially immovably in position on a fixed portion (51) of the body (10) surmounting the reservoir (12), the actuating element (34) being independently mounted relative to the fixed portion (51) of the body (10).

80 Claims, 4 Drawing Sheets

Amended

Amended

PUMP-TYPE PACKAGING UNIT FOR A LIQUID OR SEMI-LIQUID PRODUCT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a unit for packaging and dispensing a liquid or semi-liquid product, of the type comprising a pump with manual action. The invention is especially suitable for packaging and spraying liquid products used in the field of cosmetics, or dermo-pharmacology, such as perfumes.

2. Description of the Related Art

Devices for spraying liquids using a pump with manual action are well known. For example, FR 2 682 937 describes a pump-type spraying device comprising a pump mounted on a bottle and having a hollow stem which serves as an outlet conduit and as an actuating element, and is movable inside the body of the pump against the action of a spring. A dispensing cap is mounted on the bottle above the pump and has a pressurized actuating element provided with means for mechanical connection with the hollow stem. The cap also has a spraying nozzle and an internal duct which leads into the nozzle, as well as connecting means communicating the hollow stem with the internal duct of the cap. According to this document, the connecting means comprise a flexible tubular element joined to one end of the hollow stem and at the opposite end to the internal duct of the dispensing cap.

To dispense the product, the pressure actuating element is depressed, which produces the pump actuation and the emergence of the liquid through the outlet nozzle via the hollow stem, the flexible tubular element and the internal duct. Under the effect of the actuating pressure, the upper part of the cap carrying the nozzle yields at a connecting zone situated beneath the nozzle. The major drawback of such a device is due to the fact that the actuation of the pump produces a substantial modification of the position of the nozzle (by pivoting), which modification produces a change in the orientation of the sprayed liquid. Inevitably, if no precaution is taken, the product will not be sprayed to the desired spot. Another device of the same type, and hence with the same drawbacks, is described in EP-A 0 747 131.

In EP-A-0 385 077, the actuation of the pump produces an axial displacement of the outlet nozzle which must be taken into account with regard to the positioning of the spraying device relative to the surface to be treated, in the same way as the device discussed above, to ensure that the product is sprayed exactly to the desired spot. Moreover, such a design requires an oblong opening to be made opposite the nozzle, whose axial height depends on the amplitude of the axial movement of the nozzle. Such an opening of an elongate shape has a considerable effect on the aesthetic appearance of the device.

In another field, that is to say, the field of aerosols of the type comprising a pressurized container surmounted by a valve, it is known that the valve stem is connected via a conduit having a certain flexibility to an outlet opening that is substantially axially fixed, so as to absorb the axial displacement linked to the actuation of the pump as a whole, or in part. Such aerosol devices are described in FR-A 2 391 625, FR-A-2 271 995, FR-A-1 258 884, DE-A-2 655 777, U.S. Pat. Nos. 3,907,175, U.S. Pat. Nos. 3,189,232 and U.S. Pat. Nos. 5,1544,323. However, in the field of aerosols, the stroke necessary for actuating the valve is of the order of some hundredths of millimetres. In the case of a pump, the actuating stroke is of the order of several millimetres. Typically, the actuating stroke is of the order of 6 to 7 mm. Thus the stresses to be taken into account for this type of technology have nothing to do with the stresses encountered in the aerosol devices. Because of this, for many of the devices described in these documents, the structure of the dispensing head would have to be completely thought out again to adapt it to the pump-type dispensing head, therefore requiring a considerable intellectual effort. Moreover, for certain products, perfumes in particular, it is desirable that they should not be packaged in a pressurized form.

SUMMARY OF THE INVENTION

Thus, one of the objects of the invention is to provide a device fitted with a pump for packaging and dispensing a product, in particular by spraying through an outlet element whose position is substantially fixed, in particular during the actuation of the pump.

Another object is to provide a pump-type device with an improved aesthetic appearance and which is simple and economic to obtain industrially.

In accordance with the invention, these and other objects are attained by creating a unit for packaging and dispensing a liquid or semi-liquid product, comprising a body with an axis X, forming a reservoir for the product, the reservoir being surmounted by a pump actuable by an actuating element, the product emerging through at least one opening arranged in an outlet element connected to the pump by a conduit forming a flexible connection, wherein the outlet element is held substantially immovably in position on a fixed portion of the body surmounting the reservoir, and the actuating element is independently mounted relative to the fixed portion of the body.

Thus, in accordance with the invention, the only connection between the outlet element and the movable actuating element is effected via a conduit forming a flexible connection. The flexibility of the connection absorbs substantially the whole of the movement of the said actuating element, so that during the actuation of the pump the outlet element is not substantially displaced.

Advantageously, the outlet element is a nozzle for spraying a liquid product such as a perfume. Such a nozzle has a known configuration and therefore does not require any detailed description.

According to a first embodiment, the body has a transverse partition separating a first space defining the reservoir from a second space surmounting the first, the second space containing the pump being mounted on an opening arranged in the partition, the actuating element mounted on the pump, the outlet element as well as the conduit forming the flexible connection.

Advantageously, the outlet nozzle is disposed substantially immovably at the bottom of a recess formed in a side wall of the second space, the recess opening out on a free edge of the second space situated opposite to the transverse partition. The hold in position of the nozzle immobile at the bottom of the recess (in particular its positioning perpendicular to the axis of the device) may be improved by providing inside the side wall an extra thickness in alignment with the bottom of the recess, which thickness increases the width of the support for the nozzle.

The outlet element may be mounted inside a housing communicating with the conduit forming the flexible connection, the actuating element, the housing as well as the flexible conduit forming a single part and being obtained by molding a thermoplastic material. By way of example, the thermoplastic material is a low density polyethylene (PEBD) or a mixture of low density polyethylene (PEBD)/high density polyethylene (PEHD), with a PEHD content at most equal to 25% of the mixture. This permits a substantial reduction of the cost of manufacturing the unit in accordance with the invention.

Particularly in the case where the actuating element is molded, the pressing surface whereon the actuating pressure is exerted is constituted by an attached part. This facilitates the removal of the actuating element from the mold. The attached part may be mounted by catch engagement, bonding or welding.

According to another embodiment, the conduit forming the flexible connection forms a bellows. This is particularly advantageous when the product to be dispensed makes it necessary to use, because of its nature, a material for the connecting conduit which does not possess sufficient inherent flexibility. In this case, this deficiency in flexibility is mitigated by giving the conduit a flexible configuration.

According to a preferred embodiment, the body is formed of a single piece. By way of example, the body is obtained by molding a thermoplastic material chosen from polypropylenes (PP) or polyethylene terephthalates (PET), etc. The thermoplastic material may be introduced into the mold by injection.

The pump, and in particular the pump body, may be offset relative to the axis X, that is to say be eccentric. This is advantageous insofar as the stroke of actuating the valve stem is relatively large. Thus the absorption of the movement of the actuating element by the flexible connection is improved. The height of the dispensing head is also reduced.

According to an embodiment, the pump has an intake tube opening inside the first space and a hollow outlet stem, a flexible end whereof opens in the second space and whereon the actuating element is mounted, the outlet stem communicating in the mounted position of the actuating element on the pump with an opening provided in the actuating element and issuing in the conduit forming the flexible connection.

In a particular embodiment, the outlet element is situated substantially at the same level as the said free end of the outlet stem. In actual practice, with the mounting in accordance with the invention, it may be placed substantially anywhere relative to the free end of the pump stem. In particular, it may be placed beneath the free end of the pump stem, thus reducing the axial height of the unit.

According to an advantageous characteristic of the invention, the second space has an end opposite to the partition, the end being closed by a protective element, at least one portion whereof situated opposite the actuating element is formed by a flexible material so as to be capable of actuating the actuating element through the protective element. This protective element makes it possible to obtain a closed unit with an outstandingly attractive appearance. As will be seen below, this protective element may also participate in maintaining the outlet element in a fixed position relative to the body of the device.

Such a protective element may have a body in the form of a rigid or semi-rigid annular part, the protective element being held in position on the end of the second space by means of an outer shell covering the unit substantially over its whole height, an opening being arranged in the external covering opposite the outlet element, the external covering having opposite the end of the second space a top with a cutout opposite the actuating element. Advantageously, locating pin-type marking means may be provided to permit a proper angular positioning of the shell relative to the rest of the body.

The rigid or semi-rigid annular part may have a tab portion, a free end whereof is intended to bear on the outlet nozzle so as to fix the latter in position at the bottom of the cutout. Such an arrangement allows the unit to be simply and economically made and the outlet nozzle to be held immovably in position.

The shell may be self-tightening on the body of the unit, at least in the vicinity of one end of the first space on the opposite side to the partition. The self-tightening effect may be obtained by axial grooves arranged on the external surface of the body and/or on the internal surface of the shell. The shell may be made of metal or plastic. The mounting of the shell on the body may be affected by any other appropriate means. By way of example, the shell may be screwed, welded or catch engaged on the body.

The protective element may be formed by duplicate injection molding of two compatible materials, a first rigid or semi-rigid material forming the annular part, a second flexible material forming the portion situated opposite the actuating element. Two compatible materials are understood to mean two materials which are capable of forming physical-chemical bonds between them at the injection temperature. By way of illustration, the first material is a polypropylene (PP) or a high density polyethylene (PEHD), the second material consisting of SEBS.

According to a preferred embodiment, the reservoir has an attached bottom mounted in a leakproof manner on the body. This is especially advantageous in the case where the body of the unit is obtained in a single piece by molding. Moreover, it permits filling through the bottom of the reservoir.

The attached bottom may have an opening for filling the reservoir, the opening being obturated after filling by an obturating element. This opening, of a limited diameter as compared with the cross-section of the reservoir, makes it possible to reduce the risks of leakage and loss of the product over the edge of the reservoir to a considerable extent during jerky manipulation of the unit filled with the product by industrial tools before the bottom of the reservoir is closed.

Advantageously, the seal is ensured in at least two axially offset zones. A first sealing zone may be obtained by at least one catch engagement bead. The second sealing zone may be obtained by a self-tightening mounting of a portion of the attached bottom on the internal sides of the body.

Again advantageously, a third sealing zone is obtained between the first two, the third sealing zone being obtained by means of an O-ring disposed at the bottom of a groove arranged in a side wall of the attached bottom. Such a ring may made of a material such as butyl or EPDM (a terpolymer of ethylene, propylene and a diene). As for the attached bottom, it may be made of a thermoplastic material chosen in particular from polypropylenes (PP), polybutylene terephthalates (PBT), high density polyethylenes (PEHD), etc.

The product may be a pharmaceutical dermo-pharmaceutical or cosmetic product, in particular a perfume.

BRIEF DESCRIPTION OF THE DRAWINGS

Apart from the arrangements set out above, the invention consists of a certain number of other arrangements which will be explained below with regard to non-restrictive examples of the embodiment, described with reference to the attached Figures, wherein.

DETAILED DESCRIPTION OF THE PREFERRED EMBODIMENTS

Figure 1:
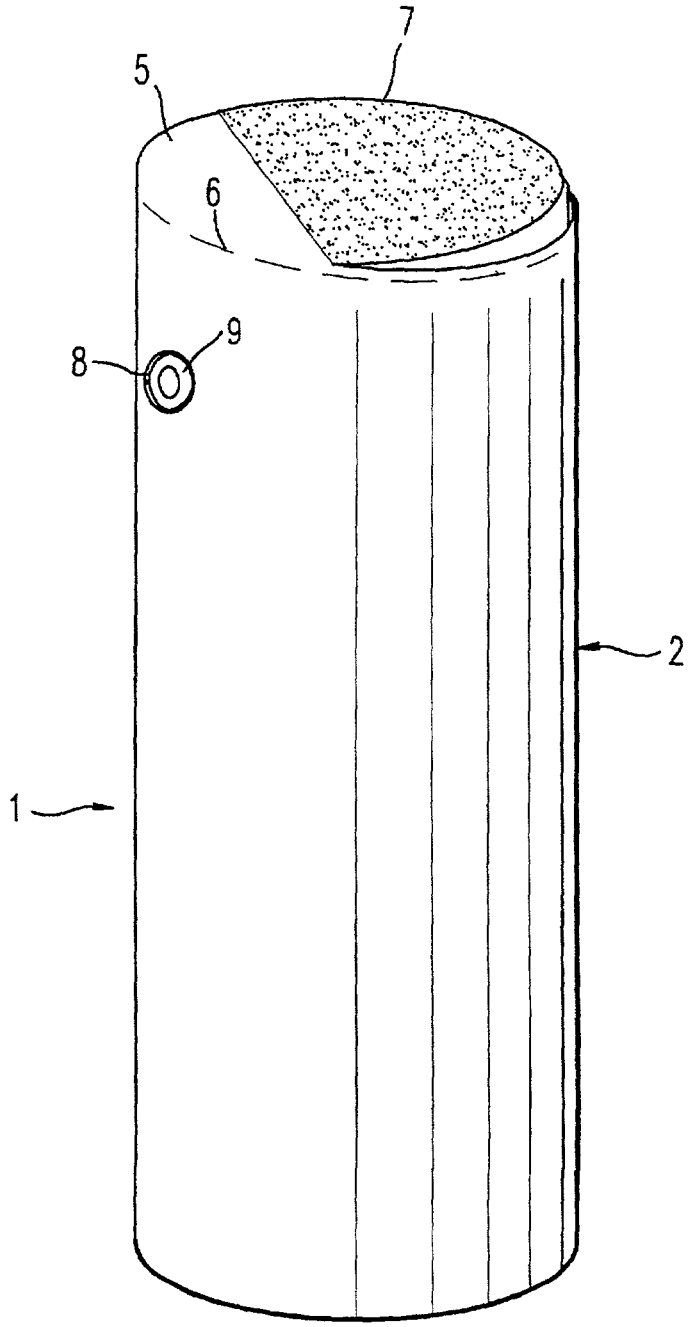
FIG. 1 is a view in perspective of a first embodiment of the packaging and dispensing unit according to the invention.

As shown in an overall view in FIG. 1, the packaging and dispensing unit 1 takes the form of an upright cylinder entirely covered by an outer shell 2 of metal, such as aluminum or a thermoplastic material such as polypropylene. The outer shell covers the whole height of the device and has its bottom end open so as to allow the device itself to be inserted therein through the open end. The upper end is closed by a top 5 having a bevelled cutout 6 over a substantial part of its cross-section, from which there emerges a flexible portion of a protective element 7. The actuation of the device with a view to spraying the product is obtained by pressing via the flexible part on a push button contained inside the shell. An opening 8 is arranged on the shell opposite a nozzle 9 also contained inside the outer shell.

Figure 2:
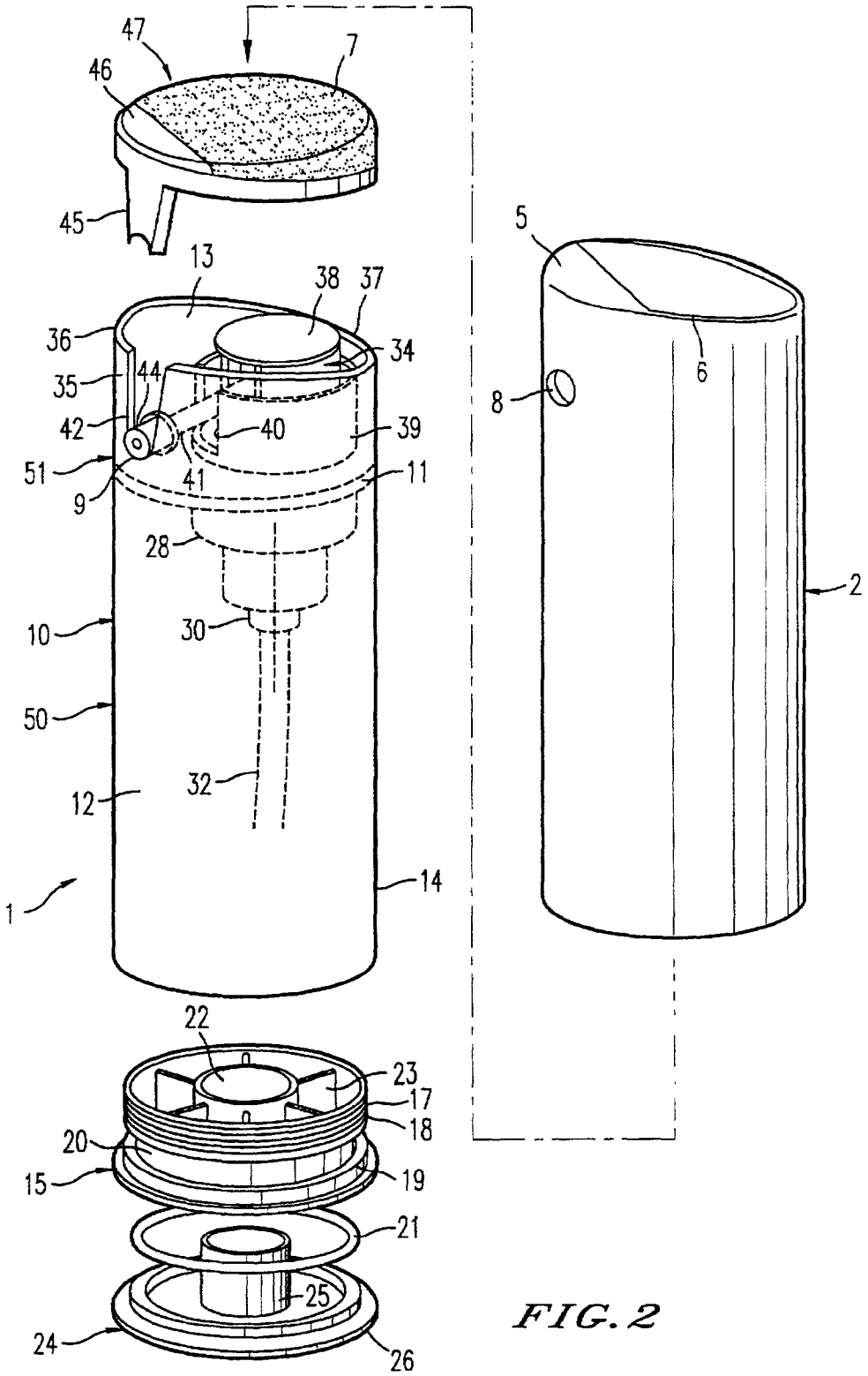
FIG. 2 is an exploded view of the unit shown in FIG. 1.
Figure 3A:
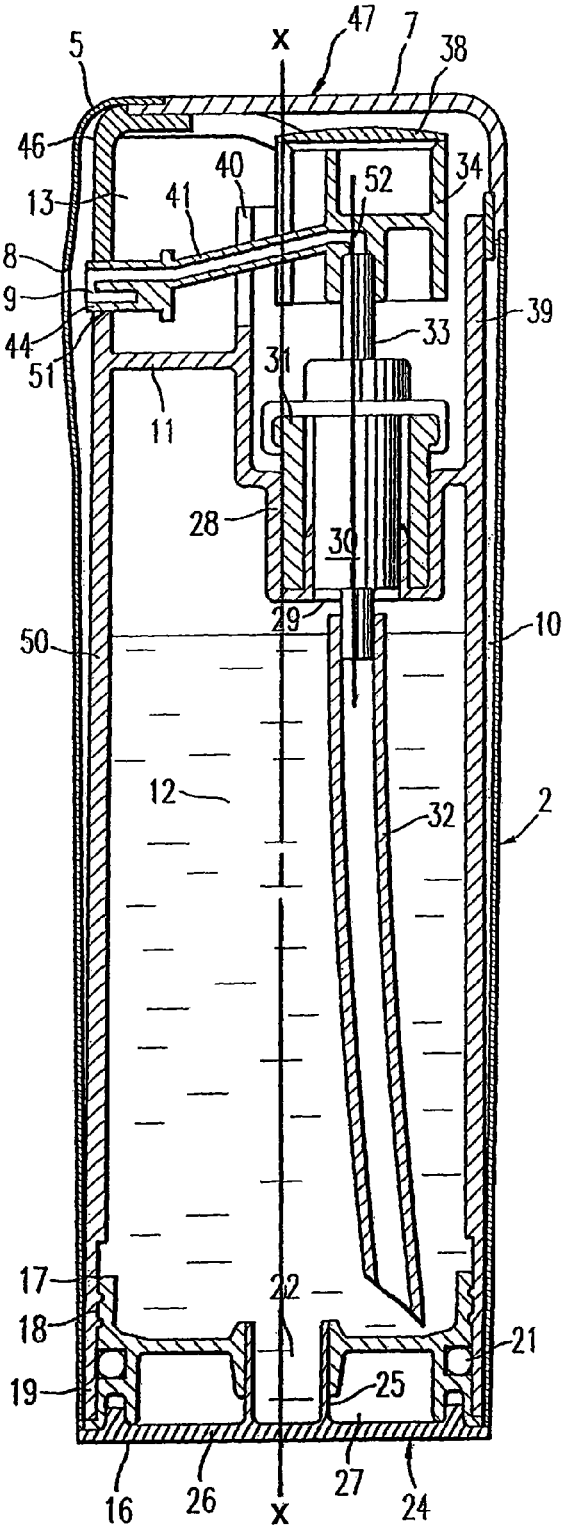
FIGS. 3A and 3B are two sectional views of the embodiment of FIGS. 1 and 2.
Figure 3B:
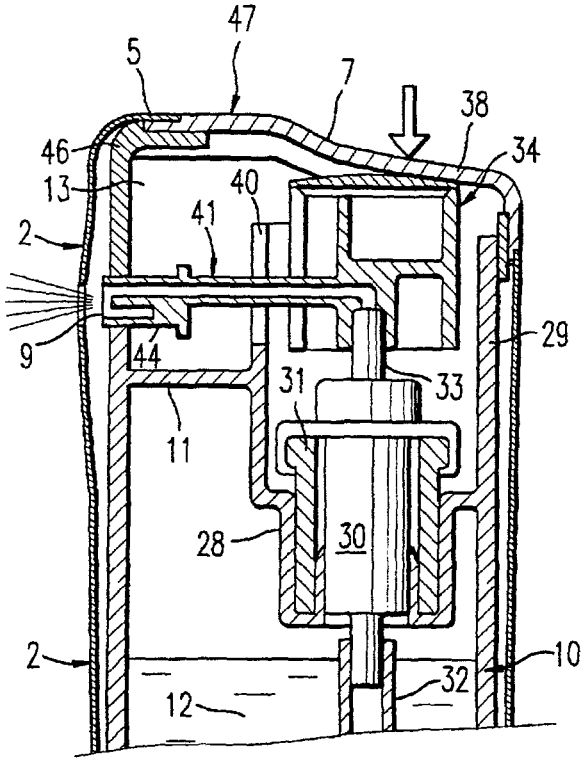

FIGS. 2 and 3A-3B illustrate a first embodiment of the device in detail. The device comprises a cylindrical body 10 comprising two parts 50, 51 separated by a transverse partition 11. The transverse partition delimits a bottom part 50 having a first space forming a reservoir 12 for the product to be dispensed. The top part 51 has a second space 13 containing all the elements necessary for dispensing the product, as will be seen in greater detail below.

The body is formed of a single piece obtained by molding (by injection molding for example) a material which is advantageously polyethylene terephthalate, for example. The bottom end 14 of the body 10 is obturated by an attached bottom 15. The attached bottom 15 has a first annular portion 17 whose external surface is provided with several beads or rings 18 capable of cooperating by catch engagement with corresponding beads arranged on the internal surface of the body 10 in the vicinity of its bottom end 14. The bottom 15 also has a second annular portion 19 capable of force fit engagement in the opening delimited by the free edge of the body 10. A part 16 with an external diameter substantially equal to the external diameter of the body 10 is situated beneath the annular portion 19 so as to limit the depression of the bottom 15 in the body. A groove 20 is disposed between the two annular portions 17, 19 so as to receive an O-ring 21 made of butyl in order to perfect the seal of the mounting of the bottom 15. The bottom 15 has a central opening 22 through which the reservoir 12 is filled after the attached bottom 15 has been mounted. Fins 23 are radially disposed in the space formed by the bottom 15 so as to stiffen its structure. The central opening is obturated by a stopper 24 comprising an axial part 25 with an external diameter substantially equal to the internal diameter of the opening 22 and a transverse side 26 with an external diameter substantially equal to the external diameter of the body 10. The stopper 24 is held in position in the opening by a force fit or by catch engagement. As will be seen more clearly in FIG. 2A, the stopper 24 defines, together with the attached bottom 15, an annular space 27 wherein an annular ballast (not shown) can be advantageously disposed.

The transverse partition 11 has a recess 28, in the bottom of which is arranged an opening 29 for the mounting of a pump 30. As will be clearly seen in FIGS. 3A and 3B, the recess 28 and the opening 29 are offset relative to the axis X of the device and in a direction such that the axis of the pump 30 is a farther from the outlet nozzle 9 than is the axis X. The mounting of the pump in the recess 28 is advantageously obtained in the way described in detail in FR 2 669 244, that is to say, by means of an annular intermediate component 31, on the free edge of which the pump 30 is crimped. During the assembly, the pump 30 is first crimped onto the intermediate component 31. The unit is subsequently mounted by catch engagement in the recess 28 through the opening 29. A dip tube 32 dips into the reservoir 12, its free end being situated substantially in the vicinity of the bottom 15 of the reservoir.

The pump 30 has a hollow pump stem 33 whose free end emerges in the second space 13 delimited by the transverse partition 11. At its upper end 35, the free edge of the body 10 is straight over approximately one third of its section 36 (the front portion of the body) and cut out with a bevel over the rest of its section 37 (the rear part of the body). On the free end of the stem 33 there is mounted a push button 34 whose pressing surface 38 emerges from the cut out edge 37 and is situated substantially at the level of the straight edge 36. The push button 34 is disposed in a duct 39 which extends the upper part of the recess 28. The manual action pump is entirely conventional and therefore does not require any detailed description.

The duct 39 has a cutout 40 for passing a flexible conduit connecting an internal duct 52 arranged in the push button with an outlet nozzle 9 mounted in a housing 44 and held fixed in position at the bottom of a cutout 42 opening out on the straight edge portion 36 of the body 10. The cutout 42 is situated substantially opposite the cutout 40.

The conduit 41 has characteristics of suppleness, flexibility and elasticity which are such that the movement of actuating the push button does not produce any substantial movement of the outlet nozzle. In actual fact, due to the way in which the nozzle is mounted at the bottom of the cutout 42, there may occur a slight recoil or a slight rocking of the nozzle. However, these movements are hardly perceptible to the naked eye.

According to a preferred embodiment, the conduit 41, the housing 44 and the push button 34 are obtained by molding a single piece of low density polyethylene. In actual fact, only the pressing plate 38 is attached and mounted by catch engagement on the push button 34. The pressing plate is made of a more rigid material than the material constituting the rest of the push button. Advantageously, the pressing plate 38 is made of a high density polyethylene or polypropylene. The outlet nozzle 9 is formed of a piece of acetate mounted with a force fit in the housing 44.

Figure 4:
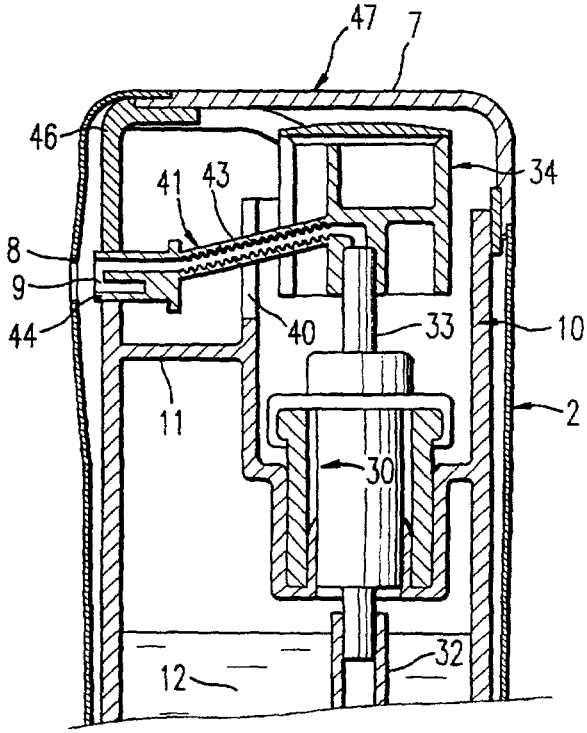
FIG. 4 shows a variant of the first embodiment shown in FIGS. 1, 2, and 3A-3B.

As will be seen in FIG. 3B, the movement of actuating the push button 34 is reflected in an displacement of the flexible conduit 41, which displacement may be accompanied by an elongation of the conduit, particularly in the case of an elastomeric material or in the case of a bellows such as shown in FIG. 4. Since the housing 44 is also made of a flexible material, the end of the housing 44 adjacent to the conduit 41 may possibly slightly rock. On the other hand, the outlet nozzle situated in the front part of the housing 44 held tightly at the bottom of the cutout 42 is substantially immobile, which considerably facilitates the spraying of the product to the desired spot.

Other materials or arrangements may be used for obtaining the flexible connection between the push button 34 and the outlet nozzle 9. By way of example, the conduit 41 may be made of an elastomeric material (a sequenced copolymer of styrene-ethylene butadiene, EPDM). In the embodiment of FIG. 4, the flexible connection is obtained by means of a conduit forming a bellows 43 over at least one portion of its length. This contributes to isolating the nozzle 9 from the push button even more, which considerably reduces the stresses exerted on the nozzle 9 when the push button 34 is actuated. The embodiment of FIG. 4 is, in other respects, identical at all points with the embodiment of FIGS. 2 and 3A-3B.

The outlet nozzle 9 disposed inside a housing 44 extending the flexible conduit 41 is held fixed in position at the bottom of the cutout 42 by means of a tab 45 carried by the annular body 46 of a protective element 47. The annular body is made, for example, of polypropylene and has a profile which overall follows the profile of the edge of the upper end 35 of the body 10. The opening delimited by the upper edge of the annular body 46 is obturated by a flexible membrane 7 positioned opposite the push button 34. The flexible membrane is advantageously made of SEBS and may be made by duplicate injection molding with the polypropylene body. During assembly, the protective element is positioned on the upper end 35 of the body 10, the internal diameter of the annular body 46 being slightly greater than the external diameter of the body 10. The tab 45 comes to bear on the upper part of the housing 44 containing the nozzle 9 which is thus fixed in position. The fixed hold of the housing 44, and hence of the nozzle 9, can be improved by providing, on the internal side of the upper space 13, an extra thickness in alignment with the bottom of the cutout 42, so as to ensure a better positioning of the housing 44.

The unit thus described is intended to be mounted inside an outer shell 2 made of aluminium for example. As has been mentioned with reference to FIG. 1, the top 5 of the outer shell 2 has a cutout with a profile similar to the cutout of the upper end 35 of the body 10, as well as the cutout formed by the upper edge of the annular body of the protective element 47. The shape of the cutout 6 in the outer shell 2 is such that it substantially coincides with the flexible membrane 7 of the protective element 47.

The assembly of the unit is obtained as follows. The pump is first mounted in the opening 29; the body 10 is upended and is filled via the bottom through the opening 22 which is subsequently obturated by the stopper 24; the push button 34, including the flexible conduit 41 and the outlet nozzle 9 inside the housing 44, is mounted on the outlet stem 33 of the pump; the protective element 47 is positioned on the upper end 35 of the body; the outer shell is subsequently fitted on the unit, marking means, (of an axial groove-type) ensuring a proper angular positioning of the body relative to the outer shell 2. The body 10 has a size slightly increasing in the direction towards its bottom end 14, so that at least in the vicinity of its bottom end 14, the body is held tight inside the outer shell 2. In the assembled position, as is clearly shown in FIGS. 3A and 3B, the bottom edge of the protective element 47 is held between the external side of the body 10 and the internal side of the shell 2. The device is then ready for use.

Alternatively, it is possible to mount the protective element on its own in the shell 2 via the cutout 6, and then mount the body of the device inside the shell.

In the preceding detailed description, reference has been made to preferred modes of embodiment of the invention. It is obvious that variants may be introduced into them without departing from the scope of the invention, such as claimed below.

I claim:

1. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the pump by a conduit forming a flexible connection, wherein the outlet element is held substantially immovably in position on the fixed portion of the body, and wherein the actuating element is mounted independent of said fixed portion of the body, wherein the body has a transverse partition separating a first space defining said reservoir from a second space surmounting the first space, said second space containing said pump mounted in said partition, the actuating element mounted on said pump, the outlet element and the conduit forming the flexible connection, wherein the second space has an end opposite said partition, further comprising a protective element closing said end, wherein at least one portion of said protective element is engagable with the actuating element and is formed by a flexible material to permit actuating said actuating element through said protective element.

2. A packaging and dispensing unit according to claim 1, further comprising an outer shell covering said unit substantially over its whole height, wherein the protective element has a body in the form of a rigid or semi-rigid annular part, said protective element being held on the end of the second space via said outer shell, further comprising an opening in said outer shell at a location corresponding to the outlet element, wherein the outer shell has a top with a cutout aligned with the actuating element.

3. A packaging and dispensing unit according to claim 2, further comprising marking elements on at least one of the outer shell and the body to permit proper angular positioning of the outer shell relative to the body.

4. A packaging and dispensing unit according to claim 2, wherein the rigid or semi-rigid annular part of the protective element has a tab portion including a free end bearing on the outlet nozzle so as to fix the latter at a bottom of the cutout in the second space.

5. A packaging and dispensing unit according to claim 2, wherein the shell is self-tightening on the body of the unit, at least in a vicinity of an end of the first space opposite the partition.

6. A packaging and dispensing unit according to claim 1, wherein the protective element is formed by duplicate injection molding two compatible materials, a first rigid or semi-rigid material forming the annular part, a second flexible material forming the portion engagable with the actuating element.

7. A packaging and dispensing unit according to claim 6, wherein the first material is one of a polypropylene (PP) and a high density polyethylene (HDPE), and wherein the second material consisting of [SEBS] *styrene-ethylene butadiene*.

8. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the actuating element by a conduit forming a flexible connection, wherein the outlet element is held substantially immovably in position on the fixed portion of the body, wherein the pump is offset relative to an axis of the body and in a direction such that an axis of the pump is farther from the product outlet element than is the axis of the body,

*wherein the body has a transverse partition separating a first space defining said reservoir from a second space surmounting the first space, said second space containing said pump mounted in said partition, the actuating*

*element mounted on said pump, the outlet element and the conduit forming the flexible connection.*

9. A packaging and dispensing unit according to claim 8, wherein the outlet element comprises a nozzle for spraying a liquid product.

[10. A packaging and dispensing unit according to claim 8, wherein the body has a transverse partition separating a first space defining said reservoir from a second space surmounting the first space, said second space containing said pump mounted in said partition, the actuating element mounted on said pump, the outlet element and the conduit forming the flexible connection.]

11. A packaging dispensing unit according to claim [10] *8*, wherein the first space has an end opposite to said partition, further comprising an attacked bottom sealingly mounted to said end.

12. A packaging and dispensing unit according to claim [10] *8*, wherein said actuating element has an internal duct opening to the conduit forming said flexible connection, wherein the pump includes an intake tube opening inside the first space and a hollow outlet stem, the hollow outlet stem having a flexible end opening in the second space, and the actuating element being mounted on the flexible end, and wherein the outlet stem communicates with said internal duct.

13. A packaging and dispensing unit according to claim 12, wherein the outlet element is situated substantially at the same axial level as said flexible end of the outlet stem.

14. A packaging and dispensing unit according to claim 8, wherein the conduit forming said flexible connection forms a bellows.

15. A packaging and dispensing unit according to claim 8, wherein the body is formed of a single piece.

16. A packaging and dispensing unit according to claim 8, wherein the body is a molded thermoplastic material taken from one of the group consisting of a polypropylene (PP) and polyethylene terephthalate (PET).

17. A packaging and dispensing unit according to [claims] *claim* 8, wherein the product is one of a pharmaceutical dermo-pharmaceutical and cosmetic product.

18. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and an outlet nozzle having at least one opening and connected to the pump by a conduit forming a flexible connection, wherein the outlet nozzle is held substantially immovably in position on the fixed portion of the body, wherein the actuating element is mounted independent of said fixed portion of the body, *wherein the body has a transverse partition separating a first space from a second space,* wherein the outlet nozzle is disposed substantially immovably at the bottom of a cutout formed in a side wall of the second space, said cutout opening out on a free edge of the second space situated opposite the transverse partition.

19. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the pump by a conduit forming a flexible connection, wherein the outlet element is held substantially immovably in position on the fixed portion of the body, wherein the actuating element is mounted independent of said fixed portion of the body, wherein the outlet element is mounted inside a housing communicating with the conduit forming the flexible connection, wherein the actuating element, the housing and the flexible conduit form a single molded part.

20. A packaging and dispensing unit according to claim 19, wherein the actuating element has a pressing surface on which an actuating pressure may be exerted.

21. A packaging and dispensing unit according to claim 19, wherein the molded part is formed of one of the group consisting of a low density polyethylene (PEBD), and a mixture of low density polyethylene (PEBD)/high density polyethylene (PEHD) wherein a PEHD content is at most equal to 25% of the mixture.

22. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the pump by a conduit forming a flexible connection, wherein the outlet element is held substantially immovably in position on the fixed portion of the body, and wherein the actuating element is mounted independent of said fixed portion of the body, wherein the body has a transverse partition separating a first space defining said reservoir from a second space surmounting the first space, said second space containing said pump mounted in said partition, the actuating element mounted on said pump, the outlet element and the conduit forming the flexible connection, wherein the first space has an end opposite to said partition, further comprising an attached bottom sealingly mounted to said end, wherein the attached bottom has an opening for filling the reservoir, further comprising an obturating element for obturating said opening.

23. A packaging and dispensing unit according to claim 22, wherein the attached bottom is made of a thermoplastic material chosen from one of polypropylenes (PP), polybutylene terephthalates (PBT) and high density polyethylenes (HDPE).

24. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the pump by a conduit forming a flexible connection, wherein the outlet element is held substantially immovably in position on the fixed portion of the body, and wherein the actuating element is mounted independent of said fixed portion of the body, wherein the body has a transverse partition separating a first space defining said reservoir from a second space surmounting the first space, said second space containing said pump mounted in said partition, the actuating element mounted on said pump, the outlet element and the conduit forming the flexible connection, wherein the first space has an end opposite to said partition, further comprising an attached bottom sealingly mounted to said end, wherein said attached bottom forms at least two axially offset sealing zones.

25. A packaging and dispensing unit according to claim 24, wherein said at least two sealing zones comprise a first sealing zone formed by at least one catch engagement bead, and a second sealing zone formed by a self-tightening mounting.

26. A packaging and dispensing unit according to claim 25, further comprising a third sealing zone between the first and second sealing zones, said third sealing zone comprising an O-ring disposed at a bottom of a groove in a side wall of the attached bottom.

27. A packaging and dispensing unit according to claim 26, wherein the O-ring is made of one of butyl and EPDM.

28. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the actuating element by a conduit forming a flexible connection, wherein the outlet element is held substantially immovably in position on the fixed portion of the body, wherein the actuating element is mounted to the pump independent of said fixed portion of the body, and wherein the pump is offset relative to an axis of the body and in a direction such that an axis of the pump is farther from the product outlet element than is the axis of the body.

[29. A unit for packaging and dispensing a liquid or semi-liquid product, comprising:

a body forming a reservoir for the product and having a fixed portion surmounting the reservoir;

a pump surmounting the reservoir;

an actuating element mounted for actuating the pump; and a product outlet element having at least one opening and connected to the actuating element by a conduit forming a flexible connection, wherein the outlet element is held substantially immovably in position on the fixed portion of the body, wherein the actuating element, upon actuation of the pump, moves axially with respect to said fixed portion of the body, and wherein the pump is offset relative to an axis of the body and in a direction such that an axis of the pump is farther from the product outlet element than is the axis of the body.]

*30. A unit for packaging and dispensing liquid or semi-liquid product, comprising:*

*a container forming a reservoir for the product;*

*a wall extending above and in fixed position with respect to said container;*

*a pump mounted to a top of said container;*

*a product outlet element held substantially immovably in position with respect to said wall; and*

*a conduit forming a flexible connection between said pump and said outlet element,*

*wherein said pump is offset relative to an axis of said container and in a direction such that an axis of said pump is farther from said product outlet element than is the axis of said container,*

*wherein said wall defines a space above said reservoir having an open end opposite said reservoir, said container having a traverse partition separating said reservoir from said space, said space containing a portion of said pump, said outlet element, and said conduit.*

*31. A packaging and dispensing unit according to claim 30, wherein said outlet element comprises a nozzle for spraying a liquid product.*

*32. A packaging and dispensing unit according to claim 30, wherein said container has an end opposite to said partition, further comprising an attached bottom sealingly mounted to said end of said container.*

*33. A packaging and dispensing unit according to claim 30, wherein said pump includes an actuating element for operating said pump, said actuating element having an internal duct opening to said conduit, wherein said pump includes an intake tube opening inside the container and a hollow outlet stem, said hollow outlet stem having an end coupled to said duct of said actuating element.*

*34. A packaging and dispensing unit according to claim 33, wherein said outlet element is situated substantially at the same level as said end of said outlet stem.*

*35. A packaging and dispensing unit according to claim 30, wherein said conduit forming the flexible connection forms a bellows.*

*36. A packaging and dispensing unit according to claim 30, wherein said container and said wall are formed of a single piece.*

*37. A packaging and dispensing unit according to claim 30, wherein said container and said wall are formed from a molded thermoplastic material chosen from polypropylene (PP) and polyethylene terephthalate (PET).*

*38. A packaging and dispensing unit according to claim 30, further comprising the product, wherein the product is one of a pharmaceutical, dermo-pharmaceutical, and cosmetic product.*

*39. A packaging and dispensing unit according to claim 30, wherein said pump includes an actuating element.*

*40. A packaging and dispensing unit according to claim 30, wherein said conduit extends from said pump to said outlet element.*

*41. A packaging and dispensing unit according to claim 30, wherein said outlet element is connected to said wall.*

*42. A unit for packaging and dispensing liquid for semi-liquid product, comprising:*

*a body having a lower portion and an upper portion fixed with respect to said lower portion;*

*a reservoir for the product, said reservoir being in said lower portion of said body;*

*a pump located at a top of said reservoir;*

*a product outlet element held substantially immovably in position with respect to said upper portion of said body; and*

*a conduit forming a flexible connection between said pump and said outlet element,*

*wherein said pump is offset relative to an axis of said body and in a direction such that an axis of said pump is farther from said product outlet element than is the axis of said body.*

*43. A packaging and dispensing unit according to claim 42, wherein said lower portion of said body forms said reservoir.*

*44. A packaging and dispensing unit according to claim 42, wherein said outlet element comprises a nozzle for spraying a liquid product.*

*45. A packaging and dispensing unit according to claim 42, wherein said body has a partition wall separating said lower portion from said upper portion.*

*46. A packaging and dispensing unit according to claim 42, wherein said pump includes an actuating element for operating said pump.*

*47. A packaging and dispensing unit according to claim 42, wherein said conduit extends from said pump to said outlet element.*

*48. A packaging and dispensing unit according to claim 46, wherein said actuating element has an internal duct opening to said conduit, wherein said pump includes an intake tube opening inside the reservoir and a hollow outlet stem, and wherein said hollow outlet stem has an end coupled to said duct of said actuating element.*

*49. A packaging and dispensing unit according to claim 48, wherein said outlet element is situated substantially at the same level as said end of said outlet stem.*

*50. A packaging and dispensing unit according to claim 42, wherein said lower portion and said upper portion are formed of a single piece.*

*51. A packaging and dispensing unit according to claim 42, further comprising the product, wherein the product is one of a pharmaceutical, dermo-pharmaceutical, and cosmetic product.*

*52. A packaging and dispensing unit according to claim 42, wherein said outlet element is connected to said upper portion.*

*53. A packaging and dispensing unit according to claim 42, wherein said pump is mounted to said body.*

*54. A unit for packaging and dispensing liquid or semi-liquid product, comprising:*

*a body;*

*a reservoir in said body;*

*a pump located at a top of said reservoir;*

*a product outlet element substantially immovably fixed with respect to said body; and*

*a conduit forming a flexible connection between said pump and said outlet element,*

*wherein said pump is offset relative to an axis of said body and in a direction such that an axis of said pump is farther from said product outlet element than is the axis of said body.*

*55. A packaging and dispensing unit according to claim 54, wherein said body forms said reservoir.*

*56. A packaging and dispensing unit according to claim 54, wherein said outlet element comprises a nozzle for spraying a liquid product.*

*57. A packaging and dispensing unit according to claim 54, wherein said body has a partition wall separating a lower portion of the body from an upper portion of the body.*

*58. A packaging and dispensing unit according to claim 54, wherein said pump includes an actuating element for operating said pump.*

*59. A packaging and dispensing unit according to claim 54, wherein said conduit extends from said pump to said outlet element.*

*60. A packaging and dispensing unit according to claim 58, wherein said actuating element has an internal duct opening to said conduit, wherein said pump includes an intake tube opening inside the reservoir and a hollow outlet stem, and wherein said hollow outlet stem has an end coupled to said duct of said actuating element.*

*61. A packaging and dispensing unit according to claim 60, wherein said outlet element is situated substantially at the same level as said end of said outlet stem.*

*62. A packaging and dispensing unit according to claim 54, wherein said body has an lower portion and an upper portion, wherein the reservoir is in the lower portion.*

*63. A packaging and dispensing unit according to claim 62, wherein said outlet element is connected to said upper portion.*

*64. A packaging and dispensing unit according to claim 63, wherein said upper portion includes a wall and wherein said outlet element is connected to said wall.*

*65. A packaging and dispensing unit according to claim 62, wherein said lower portion and said upper portion are formed of a single piece.*

*66. A packaging and dispensing unit according to claim 54, further comprising the product, wherein the product is one of a pharmaceutical, dermo-pharmaceutical, and cosmetic product.*

*67. A packaging and dispensing unit according to claim 54, wherein said pump is mounted to said body.*

*68. A packaging and dispensing unit according to claim 54, wherein said outlet element is substantially immovably fixed with respect to said reservoir.*

*69. A unit for packaging and dispensing a liquid or semi-liquid product, comprising:*

*a container forming a reservoir for the product;*

*a wall extending above and in fixed position with respect to said container, said wall defining a space above said reservoir having an open end opposite said reservoir;*

*a pump mounted to a top of said container, said pump including an actuating element, mounted independent of said wall and said container, for operating said pump;*

*a product outlet element held substantially immoveable with respect to said wall;*

*a conduit forming a flexible connection between said pump and said outlet element; and*

*a protective element closing said open end of said space defined by said wall, wherein at least one portion of said protective element is engagable with said actuating element and is formed by a material sufficiently flexible to permit operation of said actuating element through said protective element.*

*70. A packaging and dispensing unit according to claim 69, further comprising an outer shell covering said unit substantially over its whole height, wherein said protective element has a body in the form of a rigid or semi-rigid annular part, said protective element being held on the end of the space via said outer shell, and wherein said shell has an opening in said outer shell at a location corresponding to the outlet element, wherein said outer shell has a top with a cutout aligned with said actuating element.*

*71. A packaging and dispensing unit according to claim 70, further comprising marking elements on at least one of said outer shell and said container to permit proper angular positioning of said outer shell relative to said container.*

*72. A packaging and dispensing unit according to claim 70, wherein the rigid or semi-rigid annular part of said protective element has a tab portion including a free end bearing on said outlet element so as to fix said outlet element at a bottom of a cutout in said wall.*

*73. A packaging and dispensing unit according to claim 70, wherein said shell is self-tightening on said container, at least in a vicinity of an end of said container opposite said pump.*

*74. A unit for packaging and dispensing a liquid or semi-liquid product, comprising:*

*a container forming a reservoir for the product;*

*a wall extending above and in fixed position with respect to said container;*

*a pump mounted to a top of said container;*

*an actuating element mounted for actuating the pump; and*

*an outlet nozzle having at least one opening and being flow connected to said pump by a conduit forming a flexible connection, wherein said outlet nozzle is held substantially immovably in position with respect to said wall, wherein said actuating element is mounted independent of said wall and said container, wherein said outlet nozzle is disposed substantially immovably at the bottom of a cutout formed in said wall, said cutout opening out on a free edge of said wall situated opposite said container.*

*75. A unit for packaging and dispensing a liquid or semi-liquid product, comprising:*

*a container forming a reservoir for the product;*

*a wall extending above and in fixed position with respect to said container;*

*a pump mounted to a top of said container, said pump including an actuating element mounted for actuating said pump; and*

*a product outlet element having at least one opening and being flow connected to said pump by a conduit forming a flexible connection, wherein said outlet element is held substantially immovably in position with respect to said wall, wherein said actuating element is mounted independent of said wall and said container, and wherein said actuating element, said outlet element, and said flexible conduit form a single molded part.*

*76. A packaging and dispensing unit according to claim 75, wherein said actuating element has a pressing surface on which an actuating pressure may be exerted.*

*77. A unit for packaging and dispensing a liquid or semi-liquid product, comprising:*

*a container forming a reservoir for the product;*

*a wall extending above and in fixed position with respect to said container;*

*a pump mounted to a top of said container, and pump including an actuating element mounted for actuating said pump; and*

*a product outlet element having at least one opening and being flow connected to said pump by a conduit forming a flexible connection, wherein said outlet element is held substantially immovably in position with respect to said wall, and wherein said actuating element is mounted independent of said container and said wall, wherein said container has an end opposite to said pump, and wherein said unit further comprises an attached bottom sealingly mounted to said end, wherein said attached bottom has an opening for filling said reservoir, further comprising an obturating element for obturating said opening.*

*78. A unit for packaging and dispensing a liquid or semi-liquid product, comprising:*

*a container forming a reservoir for the product;*

*a wall extending above and in fixed position with respect to said container;*

*a pump mounted to a top of said container, said pump including an actuating element mounted for actuating said pump; and*

*a product outlet element having at least one opening and being flow connected to said pump by a conduit forming a flexible connection, wherein said outlet element is held substantially immovably in position with respect to said wall, and wherein said actuating element is mounted independent of said container and said wall,*

*wherein said container has an end opposite to said pump, and wherein said unit further comprises an attached bottom sealingly mounted to said end, wherein said attached bottom forms at least two axially offset sealing zones.*

*79. A packaging and dispensing unit according to claim 78, wherein said at least two sealing zones comprise a first sealing zone formed by at least one catch engagement bead, and a second sealing zone formed by a self-tightening mounting.*

*80. A packaging and dispensing unit according to claim 79, further comprising a third sealing zone between the first and second zones, said third zone comprising an O-ring disposed at a bottom of a groove in a side wall of said attached bottom.*

*81. A unit for packaging and dispensing a liquid or semi-liquid product, comprising:*

*a container forming a reservoir for the product;*

*a wall extending above and in fixed position with respect to said container;*

*a pump mounted to a top of said container, said pump including an actuating element mounted for actuating the pump; and*

*a product outlet element having at least one opening and being flow connected to the actuating element by a conduit forming a flexible connection, wherein said outlet element is held substantially immovably in position with respect to said wall, wherein said actuating element is mounted to said pump independent of said container and said wall, and wherein said pump is offset relative to an axis of said container and in a direction such that an axis of said pump is farther from said product outlet element than is the axis of said container.*

*82. A unit for packaging and dispensing a liquid or semi-liquid product, comprising:*

*a container forming a reservoir for the product;*

*a wall extending above and in fixed position with respect to said container;*

*a pump mounted to a top of said container, said pump including an actuating element mounted for actuating said pump; and*

*a product outlet element having at least one opening and being flow connecting to the actuating element by a conduit forming a flexible connection, wherein said outlet element is held substantially immovably in position with respect to said wall, wherein said actuating element, upon actuation of said pump, moves axially with respect to said wall, and wherein said pump is offset relative to an axis of said container and in a direction such that an axis of said pump is farther from said product outlet element than is the axis of said container.*

* * * * *